US008756937B2

(12) United States Patent
Dooley (10) Patent No.: US 8,756,937 B2
(45) Date of Patent: Jun. 24, 2014

(54) FUEL SYSTEM OF GAS TURBINE ENGINES (75) Inventor: Kevin Allan Dooley, Mississauga (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 1101 days.

(21) Appl. No.: 12/762,705

(22) Filed: Apr. 19, 2010

(65) Prior Publication Data
US 2010/0199681 A1 Aug. 12, 2010

Related U.S. Application Data (62) Division of application No. 11/409,213, filed on Apr. 24, 2006, now Pat. No. 7,726,112.

(51) Int. Cl.
F02C 1/00 (2006.01)

(52) U.S. Cl.
USPC ............................................................ 60/772

(58) Field of Classification Search
USPC .................... 60/39.094, 39.281, 734, 772
See application file for complete search history.

(56) References Cited

U.S. PATENT DOCUMENTS

| 3,344,602 | A | 10/1967 | Davies et al. |
| 4,041,695 | A | 8/1977 | Harper et al. |
| 4,206,595 | A | 6/1980 | Cole |
| 4,539,809 | A | 9/1985 | Stanley et al. |
| 4,964,270 | A | 10/1990 | Taylor et al. |
| 5,020,314 | A | 6/1991 | Brophy et al. |
| 5,095,694 | A | 3/1992 | Shekleton et al. |
| 5,277,023 | A | 1/1994 | Bradley et al. |
| 5,417,054 | A | 5/1995 | Lee et al. |
| 5,528,897 | A | 6/1996 | Halin |
| 5,701,732 | A | 12/1997 | Nesbitt et al. |
| 5,809,771 | A | 9/1998 | Wernberg |
| 5,881,550 | A | 3/1999 | Toelle |
| 5,896,737 | A | 4/1999 | Dyer |
| 5,927,067 | A | 7/1999 | Hanloser et al. |
| 5,966,926 | A | 10/1999 | Shekleton et al. |
| 6,195,978 | B1 | 3/2001 | Futa, Jr. |
| 6,244,034 | B1 | 6/2001 | Taylor et al. |
| 6,314,998 | B1 | 11/2001 | Futa, Jr. et al. |
| 6,334,296 | B2 | 1/2002 | Futa, Jr. et al. |
| 6,385,962 | B2 | 5/2002 | Futa, Jr. et al. |
| 6,442,925 | B1 | 9/2002 | Dalton et al. |

(Continued)

FOREIGN PATENT DOCUMENTS

| BE | 461565 A | 12/1945 |
| FR | 960048 A | 4/1950 |
| WO | 98/25082 | 6/1998 |

OTHER PUBLICATIONS

European Search Report dated Mar. 18, 2011 issued by the European Patent Office with respect to Applicant's corresponding European application No. EP 0725162.9-1267 / 1849975.

Primary Examiner — Phutthiwat Wongwian
(74) Attorney, Agent, or Firm — Norton Rose Fulbright Canada LLP (57) ABSTRACT A method for purging fuel from a fuel system of a gas turbine engine on shutdown of the engine comprises, in one aspect, terminating a fuel supply to the fuel system and using the residual compressed air to create a reversed pressure differential in the fuel system relative to a forward pressure differential of the fuel system used to maintain fuel supply for engine operation, and under the reversed pressure differential substantially purging the fuel remaining in the system therefrom to a fuel source.

6 Claims, 9 Drawing Sheets

(56) References Cited

U.S. PATENT DOCUMENTS

| | | |
|---|---|---|
| 6,536,217 B2 | 3/2003 | Lipinski et al. |
| 6,619,025 B2 | 9/2003 | Wernberg |
| 6,655,152 B2 | 12/2003 | Griffiths et al. |
| 6,675,570 B2 | 1/2004 | Herbison et al. |
| 6,675,583 B2 | 1/2004 | Willis et al. |
| 6,751,939 B2 | 6/2004 | Futa, Jr. et al. |
| 6,804,946 B2 | 10/2004 | Willis et al. |
| 6,807,801 B2 | 10/2004 | McCarty |
| 6,877,306 B2 | 4/2005 | Wernberg et al. |
| 6,892,544 B2 | 5/2005 | Futa, Jr. et al. |
| 7,530,260 B2 | 5/2009 | Dooley |
| 2001/0027640 A1 | 10/2001 | Futa, Jr. et al. |
| 2003/0200754 A1 | 10/2003 | Futa, Jr. et al. |
| 2007/0180831 A1* | 8/2007 | Bland .............. 60/773 |
| 2008/0256954 A1 | 10/2008 | Dooley |

* cited by examiner

FUEL SYSTEM OF GAS TURBINE ENGINES

CROSS-REFERENCE TO RELATED APPLICATIONS

This is a Division of Applicant's U.S. patent application Ser. No. 11/409,213 filed on Apr. 24, 2006.

TECHNICAL FIELD

The invention relates generally to gas turbine engines, and more particularly, to an improved fuel system of gas turbine engines.

BACKGROUND OF THE ART

A gas turbine engine typically includes a fuel system for delivery of fuel from a fuel source to a combustor where the fuel in combination with compressed air is ignited and produces combustion gases to drive the turbine engine. The fuel is delivered through the system under a fuel pressure established by a fuel pump. When the turbine engine is shut down for any reason, fuel remains in the system. Fuel, particularly liquid fuel, in the fuel system can result in gumming, coking, and similar disadvantageous results, thereby decreasing the operational life of the components, such as fuel nozzles. Furthermore, cold fuel remaining within the fuel system which is not under pressure and is un-metered, can interfere with the next turbine start-up process. The fuel remaining in the system will eventually be lost through leakage from the fuel nozzles, which is not acceptable for ecological reasons and is not effectively used for engine operation. Efforts have been made to find methods of purging fuel from the fuel system on shutdown of the engine. Conventionally, fuel remaining in the system is discharged into the combustor and cannot be reused, or is sucked into an ecology valve cylinder to be stored for re-use in the next engine start-up process but this requires a complicated system structure and compromises the performance reliability of the fuel system and adds weight.

Accordingly, there is a need to provide an improved fuel system of gas turbine engines.

SUMMARY OF THE INVENTION

It is therefore an object of this invention to provide a fuel system of gas turbine engines and a method for operating a fuel system of gas turbine engines, overcoming the disadvantages of the prior art.

In one aspect, the present invention provides a method for purging fuel from a fuel system of a gas turbine engine on shutdown of the engine, comprising: terminating a fuel supply to the fuel system on shutdown of the engine; and using residual compressed air in a combustor of the engine to create a reversed pressure differential in contrast to a forward pressure differential of the fuel system when the engine is in operation, and under the reversed pressure differential substantially purging the fuel remaining in the system therefrom to the fuel source.

In another aspect, the present invention provides a liquid fuel reverse purge control system for a fuel manifold of a gas turbine engine comprising a fuel pump for pressurizing fuel from a fuel source; a fuel manifold in fluidic communication with a compressor stage of the engine; a fluidic connection between the fuel pump and the fuel manifold for controllable delivery of fuel from the fuel source to the fuel manifold, the fluidic connection having a fuel purge passage and a first control valve associated therewith to selectively open and close the fuel purge passage; and a control unit in controlling contact with the first control valve to open the fuel purge passage on shutdown of the engine, thereby allowing residual compressor air diverted to the fuel manifold to force fuel to flow back from the fuel manifold through the fluidic connection to the fuel source.

In another aspect, the present invention provides a method for operating a fuel system of a gas turbine engine, comprising pumping a fuel flow from a fuel source through a first section of the system to a pilot torch nozzle for pilot torch ignition; pumping a fuel flow from the fuel source through a second section of the system to a manifold of a combustor of the engine for combustion; and wherein a pressure differential between the first and second sections is monitored as a reference signal.

In a further aspect, the present invention provides fuel system of a gas turbine engine comprising a fuel pump for pressurizing fuel from a fuel source; a pilot torch nozzle in fluidic communication with a compressor stage of the engine; a fuel manifold of a combustor in fluidic communication with the compressor stage of the engine; a fluidic connection extending from the fuel pump and dividing into at least first and second sections thereof to connect the respective pilot torch nozzle and the fuel manifold; a control unit in electrical contact with the fluidic connection for controllably operating the fuel system; and a differential pressure transducer between the first and second sections of the fluidic connection for monitoring a pressure differential therebetween as a reference signal to be used by the control unit.

Further details of these and other aspects of the present invention will be apparent from the detailed description and drawings included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
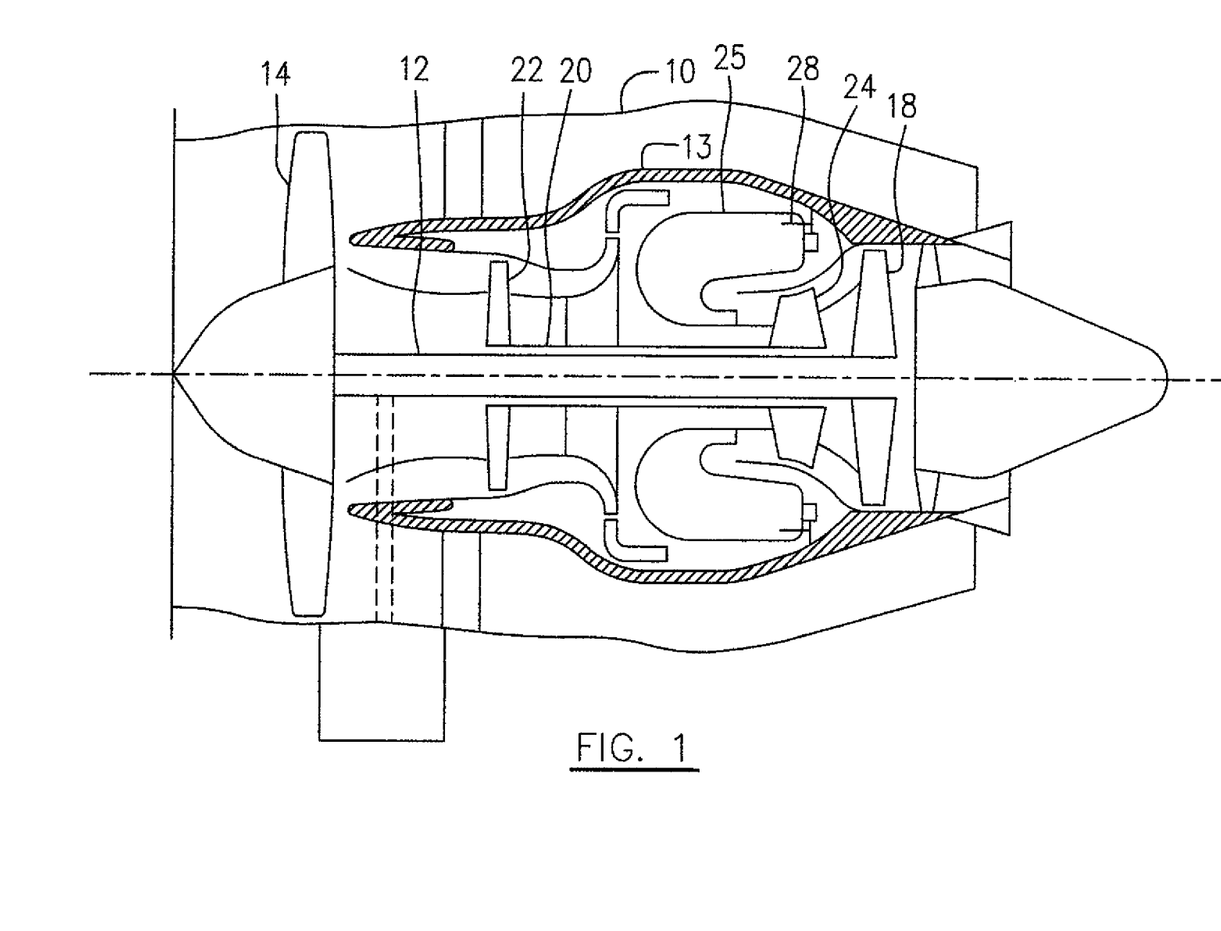
FIG. 1 is a schematic cross-sectional view of a turbofan gas turbine engine as an example illustrating an application of the present invention.

Referring to FIG. 1, a turbofan gas turbine engine incorporating an embodiment of the present invention is presented as an example of the application of the present invention, and includes a housing or nacelle 10, a core casing 13, a low pressure spool assembly seen generally at 12 which includes a fan assembly 14 and a low pressure turbine assembly 18, and a high pressure spool assembly seen generally at 20 which includes a compressor assembly 22 and a high pressure turbine assembly 24. The core casing 13 surrounds the low and high pressure spool assemblies 12 and 20 in order to define a main fluid path (not indicated) therethrough. In the main fluid path there are provided a combustor seen generally at 25 and a fuel system 28 for delivery of fuel to the combustor 25 for combustion. The compressor assembly 22 provides a compressed airflow (not indicated) through the main fluid path and in communication with the combustor 25 for combustion therein.

Figure 2:
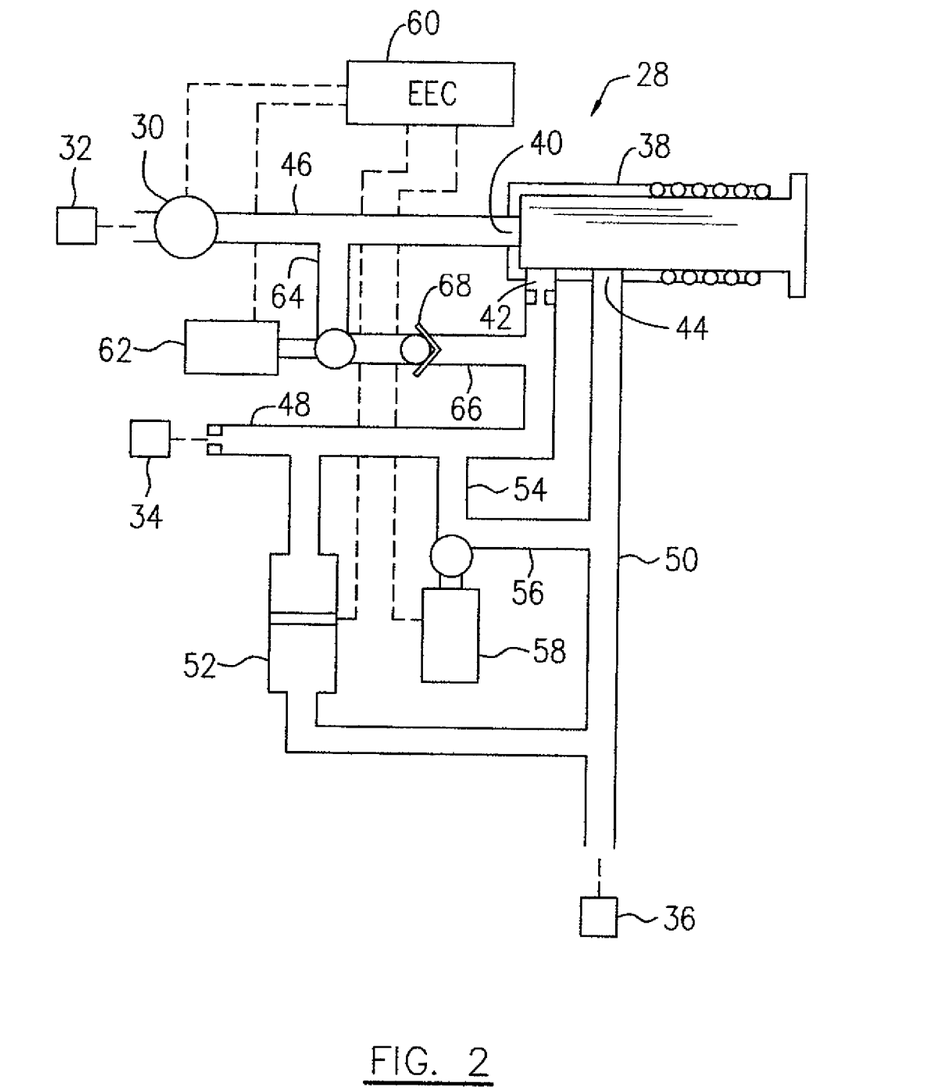
FIG. 2 is a schematic illustration of a fuel system used for the engine of FIG. 1, showing one embodiment of the present invention.

Referring to FIGS. 1 and 2, the fuel system 28 according to one embodiment of the present invention, comprises a fuel pump 30 (a vane type of fuel pump is preferred, which is driven independent of the high pressure spool) for pressurizing the fuel to establish a fuel pressure under which fuel is delivered from a fuel source 32 through a fluidic connection of the fuel system 28 preferably to at least one pilot nozzle such as a torch nozzle 34 or some other form of primary nozzle, which is used to initialize ignition of combustion in the combustor 25, and a main manifold 36 of the combustor 25 which distributes fuel to fuel nozzles of the combustor 25 in order to supply fuel for combustion within the combustor 25. The main manifold 36 is in fluid communication with the combustion chamber which in turn is in a fluidic communication with a stage of the compressor 22. The fluidic connection of the fuel system 28 further includes, for example, a minimum pressure/flow divider valve 38 having an inlet 40 and outlets 42, 44, which are normally closed under a spring force of the minimum pressure/flow divider valve 38. The minimum pressure/flow divider valve 38 is adapted to open the outlet 42 only when inlet 40 is exposed to a low pressure which is equal to or above a predetermined minimum pressure threshold, but is lower than a predetermined high pressure threshold, or to open both outlets 42 and 44 when inlet 40 is exposed to a high pressure, which is equal to or above the predetermined high pressure threshold. This will be further discussed with reference to the system operation process.

A fuel flow passage 46 interconnects the fuel pump 30 and the inlet 40 of the minimum pressure/flow divider valve 38, and a fuel flow passage 48 is connected between the outlet 42 and the pilot torch nozzle 34. There is a fuel flow passage 50 extending between the outlet 44 of the minimum pressure/flow divider valve 38 and the main manifold 36 in a parallel relationship with the fuel flow passage 48. It should be noted that due to the flow rate difference between the required fuel flow to the pilot torch nozzle 34 (the torch flow) and the fuel flow to the main manifold 36 (the manifold flow), the fuel flow passage 48 is sized in cross-section smaller than the fuel flow passage 50, thereby resulting in a high flow resistance of the fuel flow passage 48 relative to the fuel flow passage 50.

A differential pressure transducer 52 is preferably connected between the fuel flow passage 48 and the fuel flow passage 50 such that a pressure differential between fuel flow passages 48 and 50 can be monitored from time to time and particularly during engine start up while no fuel flow is delivered to the main manifold 36. The differential pressure transducer 52 is electrically connected to an electrical engine control (EEC) 60 such that the pressure differential between the fuel flow passages 48 and 50 monitored by the differential pressure transducer 52, can be used by EEC 60 as a reference signal for controlling the operation process of the fuel system 28.

In practice, metering the start fuel flow using only the fuel pump characteristics is not very practical. However, when the pressure differential between the pilot nozzle fuel supply and the main manifold (which is in communication with the combustor chamber pressure) is measured, the fuel flow to the pilot nozzle can be calculated and thus controlled by adjusting the speed of the fuel pump via the EEC.

A flow equalization solenoid valve 58 is preferably connected by fuel flow passages 54, 56 to the respective fuel flow passages 48 and 50, in a parallel relationship with the differential pressure transducer 52. The flow equalization solenoid valve 58 is a normally open valve to allow a fluidic communication between the fuel flow passages 48 and 50 when the minimum pressure/flow divider valve 38 closes outlets 42 and 44 thereof. The flow equalization solenoid valve 58 is electrically connected to and controlled by EEC 60 and is adapted to close the fuel flow passages 54, 56 when a control signal is received from the EEC 60.

The differential pressure transducer 52 is in fluidic connection with the respective pilot torch nozzle 34 and the main manifold 36 which are in turn in fluid communication with the combustion chamber, which is supplied with air pressure from the compressor, for example, P3 compressor air. Therefore, the P3 compressor air pressure is automatically provided to the differential pressure transducer 52 as a reference pressure via fuel flow passage 50, when the flow equalization solenoid valve 58 is in the closed position and outlet 44 of the minimum pressure/flow divider valve 38 is closed (when the compressor 22 is rotated either by the turbine 24 or by a starter) for monitoring the pressure differential between the fuel flow passages 48 and 50. For example, the pressure differential between the fuel flow passages 48 and 50 monitored by the differential pressure transducer 52, can be used for monitoring a fuel flow through the fuel flow passage 48 to the pilot torch nozzle 34 during the engine start-up process, and to determine when to deactivate the flow equalization solenoid valve 58 to open the fuel flow passages 54, 56 in order to allow the fuel flow to pass through the fuel flow passage 50 to the main manifold 36. This will be further described hereinafter.

An ecology solenoid valve 62 is preferably provided to control fuel flow passages 64, 66 which are connected to the respective fuel flow passages 46 and 48 to form a bypass over the minimum pressure/flow divider valve 38. The ecology solenoid valve 62 is normally closed and is electrically connected to EEC 60. The ecology solenoid valve 62 can be controlled by EEC 60 to selectively open for establishing the fluidic connection of the fuel system 28 between the fuel source 32 and the main manifold 36 as well as the pilot torch nozzle 34 when required.

A check valve 68 is preferably provided within the fuel flow passage 66. Should the ecology valve 62 be opened in malfunction, the check valve 68 ensures that the bypass connection over the minimum pressure/flow divider valve 38 should be used only for fuel flowing therethrough back to the fuel pump 30 and the fuel source 32, but not for fuel supply therethrough from the fuel pump 30.

FIGS. 3-8 illustrate the steps of operation of the fuel system 28. For convenience of description, different numerals in those Figures are used in connection with arrows to indicate fluid flows under pressure differentials having different values. A single head arrow indicates the direction of the fluid flow and a double head arrow indicates the fluid flow is blocked.

Figure 3:
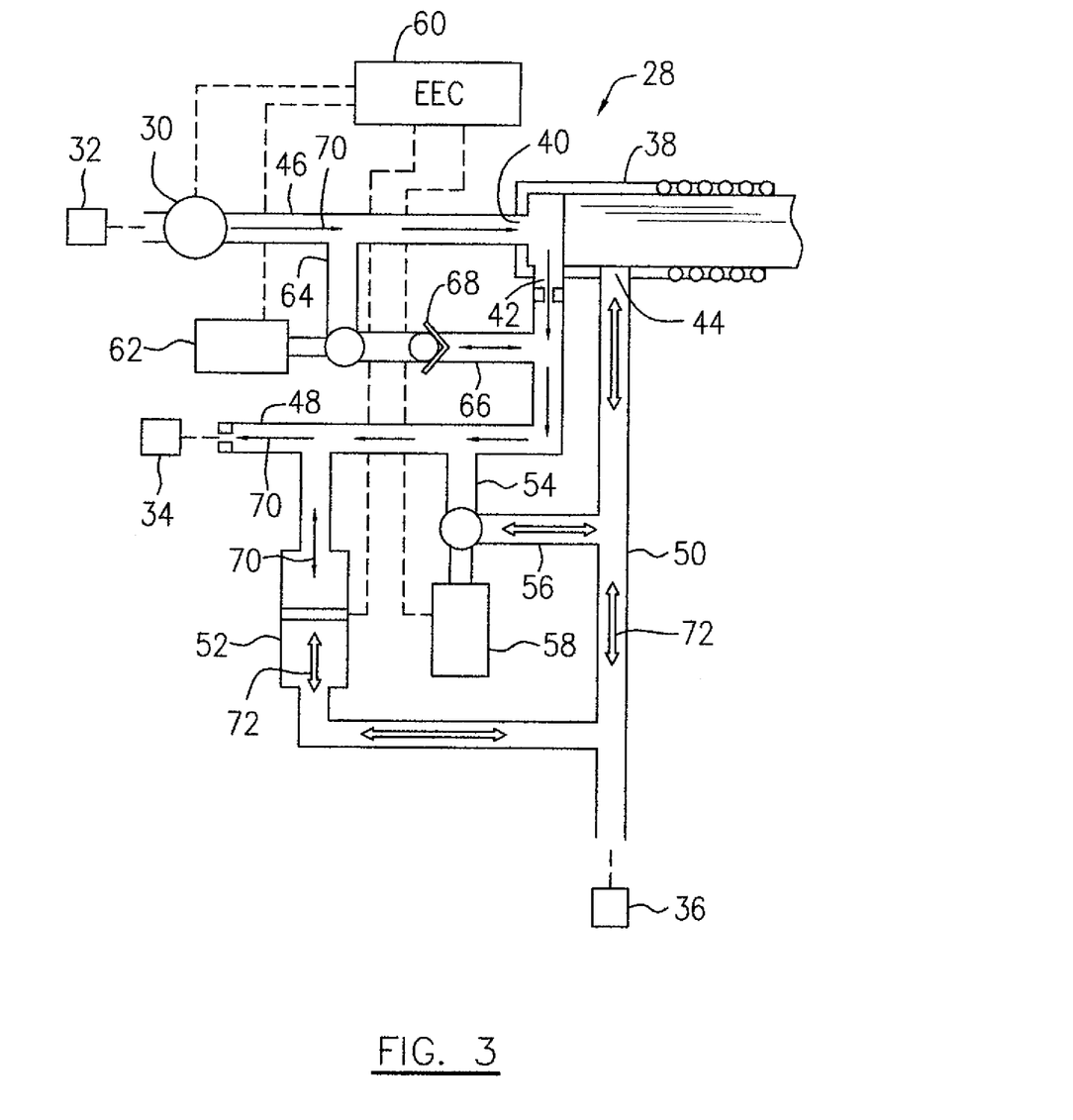
FIG. 3 is a schematic illustration of the fuel system of FIG. 2, showing a step of the fuel system operation for supplying a torch flow to a pilot torch nozzle while a main manifold is in a dry condition.

Referring to FIG. 3, EEC 60 controls the fuel pump 30 to operate at a speed to establish the low fuel pressure during engine start conditions. The low fuel pressure forces the minimum pressure/flow divider valve 38 to open the inlet 40 and outlet 42, allowing a fuel flow indicated by arrow 70 to pass through the fuel passages 46, 48 to the pilot torch nozzle 34. The ecology solenoid valve 62 is normally closed such that there is no fuel flow through the bypass formed by the fuel flow passages 64, 66. The flow equalization solenoid valve 58 is activated by EEC 60 to be closed during the initial engine start condition such that there is no fuel flow passing through fuel flow passage 50 to the main manifold 36, either via the minimum pressure/flow divider valve 38 or via the fuel flow passages 54, 56. The fuel flow passage 50 and the main manifold 36 may either remain in a dry condition (or be pre-filled with fuel), having a pressure therein equal to the air pressure in the combustor 25 of FIG. 1. The air (or the pre-filled fuel) inside of the fuel flow passage 50 and the main manifold 36 under such air pressure, is indicated by the hollow double-head arrows 72. The low fuel pressure in the fuel flow passages 46, 48 is higher than the pressure in the fuel flow passage 50, thereby forming a pressure differential therebetween. The pressure differential is monitored by the differential pressure transducer 52 which sends corresponding signals to EEC 60.

Figure 4:
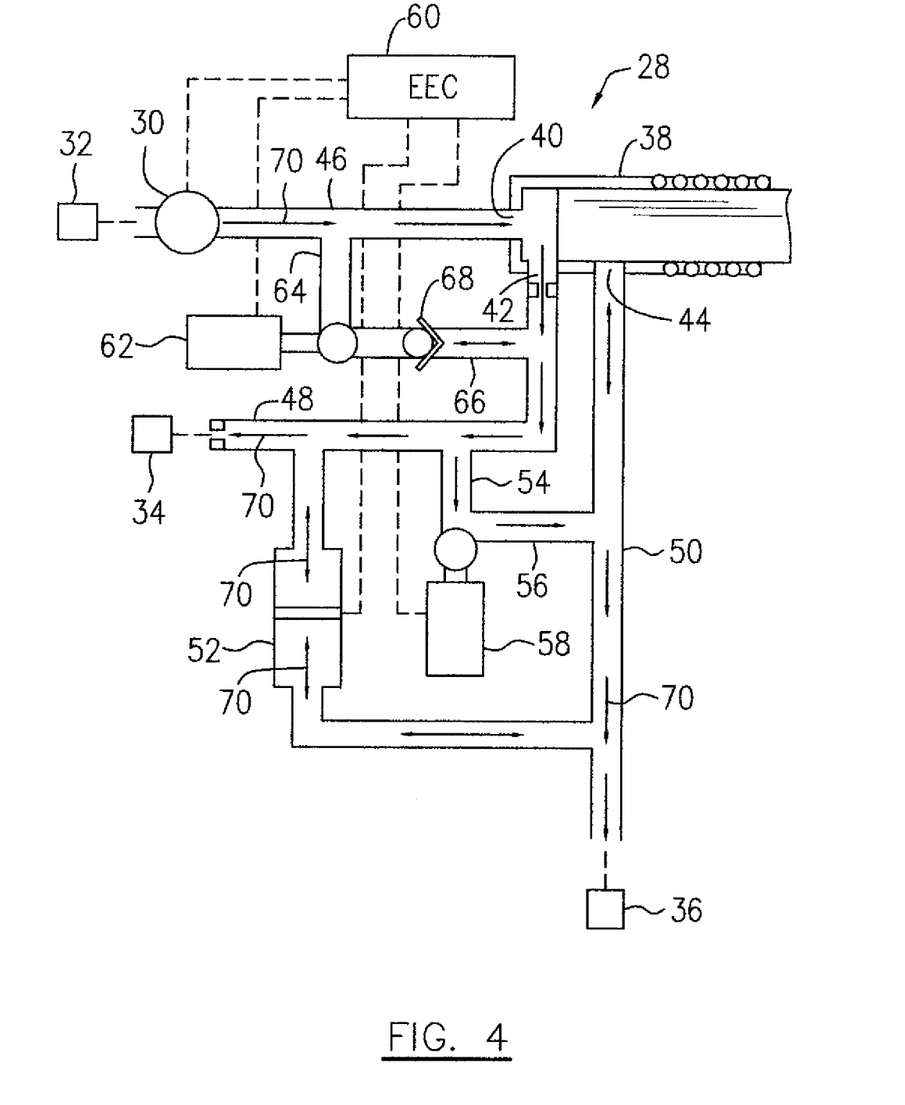
FIG. 4 is a schematic view of the fuel system of FIG. 2, showing another step of the fuel system operation for supplying both torch and manifold flows under a low fuel pressure to the respective pilot torch nozzle and the main manifold of the combustor.
Figure 5:
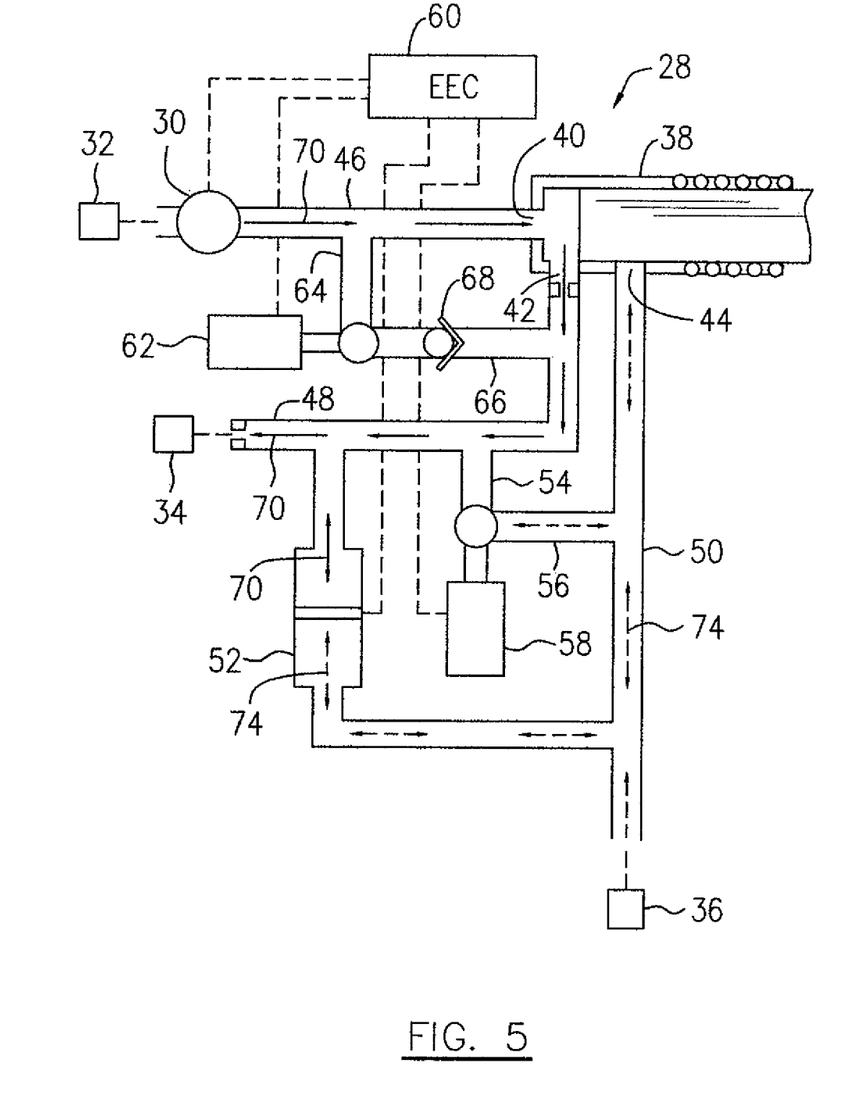
FIG. 5 is a schematic view of the fuel system of FIG. 2, showing a further step of the fuel system operation, similar the step of FIG. 3, but with the main manifold refilled with the fuel.

Referring to FIGS. 4 and 5, the flow equalization solenoid valve 58 is preferably deactivated to temporarily open the fuel flow passages 54, 56 during the low fuel pressure start condition of the engine, to allow the fuel to flow through the fuel flow passages 54, 56 and 50 into the main manifold 36 until the main manifold 36 and the fuel flow passage 50 are filled up with fuel, and then the flow equalization solenoid valve 58 is activated to close the fuel flow passages 54, 56, as shown in FIG. 5.

When the fuel flow passages 54, 56 are temporarily open, the fuel pump 30 is controlled by EEC 60 to operate at a higher speed to provide a fuel flow at a high rate for the required fuel volume to both the pilot torch nozzle 34 and the main manifold 36, while maintaining the low fuel pressure for the appropriate operation of the minimum pressure/flow divider valve 38, in order to ensure that the main manifold fill-up process is under control.

The pressure differential between the fuel flow passages 48 and 50 which is monitored by the differential pressure transducer 52, varies during the process of the main manifold fill-up. The differential pressure transducer 52 detects when the main manifold 36 and the fuel flow passage 50 are filled up with fuel because a pressure pulse will occur when all of the air has been expelled from the main manifold 36 and the fuel flow passage 50 which will act in a specific direction on the differential pressure transducer 52. The flow equalization solenoid valve 58 is then activated by EEC 60 to close, thereby blocking the fuel flow to the main manifold 36.

After the main manifold 36 and the fuel flow passage 50 are filled up with fuel and the fuel flow passages 54 and 56 are closed by the flow equalization solenoid valve 58, as shown in FIG. 5, the fuel remaining in the fuel flow passage 50 under a fuel pressure, as indicated by double-head broken arrows 74, is exposed to and the pressure thereof is equal to the P3 compressor air because the compressor 22 of FIG. 1 is rotated by an engine starter although the engine is not being operated by combustion gases at this moment.

Figure 6:
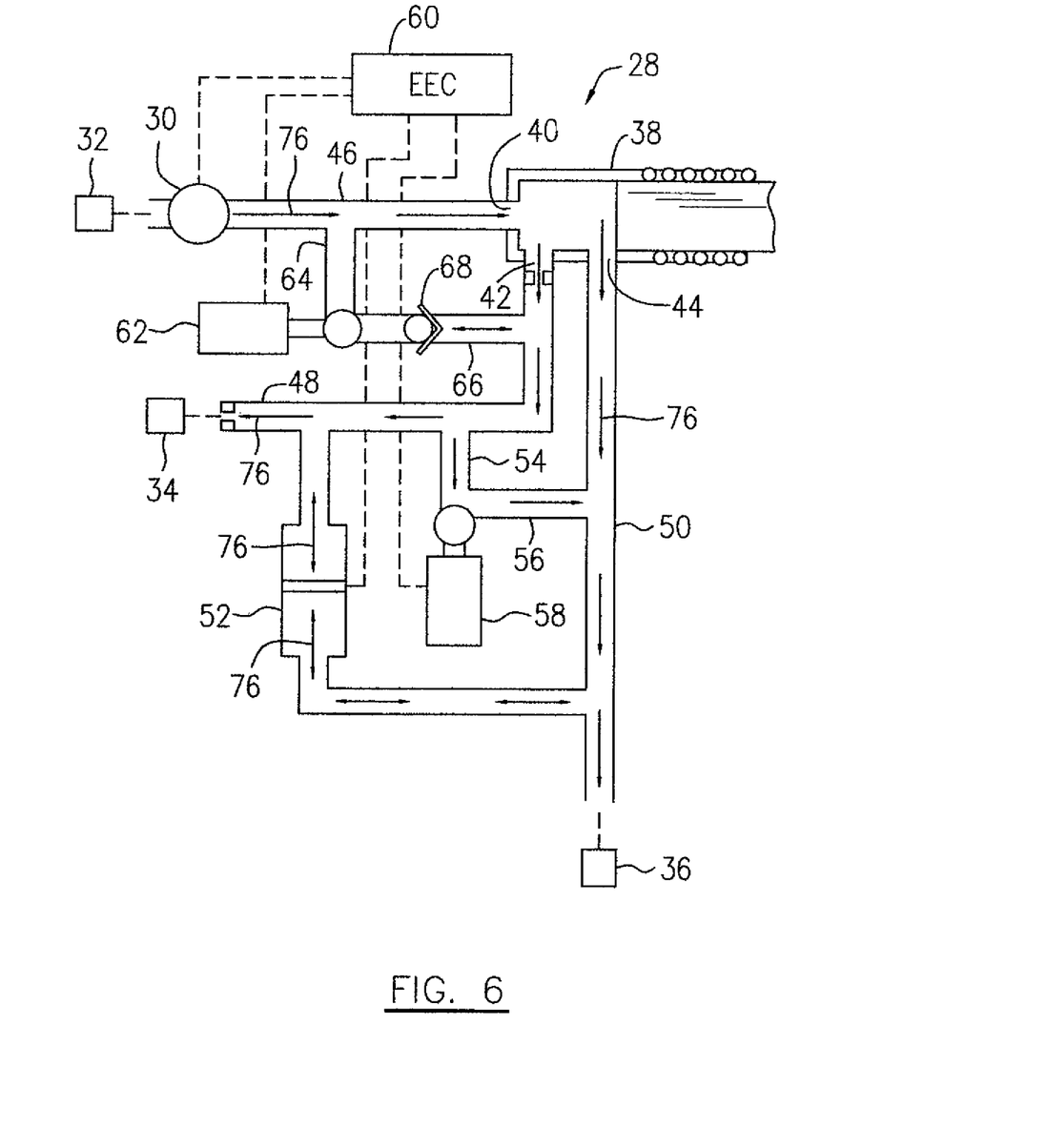
FIG. 6 is a schematic illustration of the fuel system of FIG. 2, showing a further step of the fuel system operation for supplying both the torch flow and main manifold flow under a high fuel pressure to the respective pilot torch nozzle and the main manifold of the combustor.

In FIG. 6, during the engine start-up the pilot torch from the pilot torch nozzle 34 is lit up, and upon which EEC 60 commands the fuel pump to increase the pump drive to establish a higher fuel pressure in order to force the minimum pressure/flow divider valve 38 to open both outlets 42 and 44 which results in a gradual and controlled increase in the fuel flow, as the compressor speed increases. Meanwhile, EEC 60 commands the flow equalization solenoid valve 58 to open the fuel flow passages 54, 56, thereby allowing fuel flow via both outlets 42, 44 through the fuel flow passage 50 to the main manifold 36 for establishing a properly distributed fuel flow between all nozzles and a stable combustion process in the combustor 25 of FIG. 1. At the same time, fuel flow 76 moves via outlet 42 of the minimum pressure/flow divider valve 38 through the fuel flow passage 48 to the pilot torch nozzle 34 to maintain the pilot torch. This process will be maintained during engine operation for a stable combustion in the engine combustor 25.

The check valve 68 in fuel flow passage 66 does not allow fuel flow from the fuel pump 30 to pass the bypass formed by the fuel flow passages 64, 66, to the fuel flow passage 48. EEC 60 also commands the ecology solenoid valve 62 to close the bypass. Therefore, during engine start-up and the entire engine operation process, fuel is supplied from the fuel source 32 to the respective fuel torch nozzle 34 and the main manifold 36 through the fluidic connection of the fuel system 28 via the minimum pressure/flow divider valve 38, but not via the closed bypass of fuel flow passages 64, 66.

Figure 7:
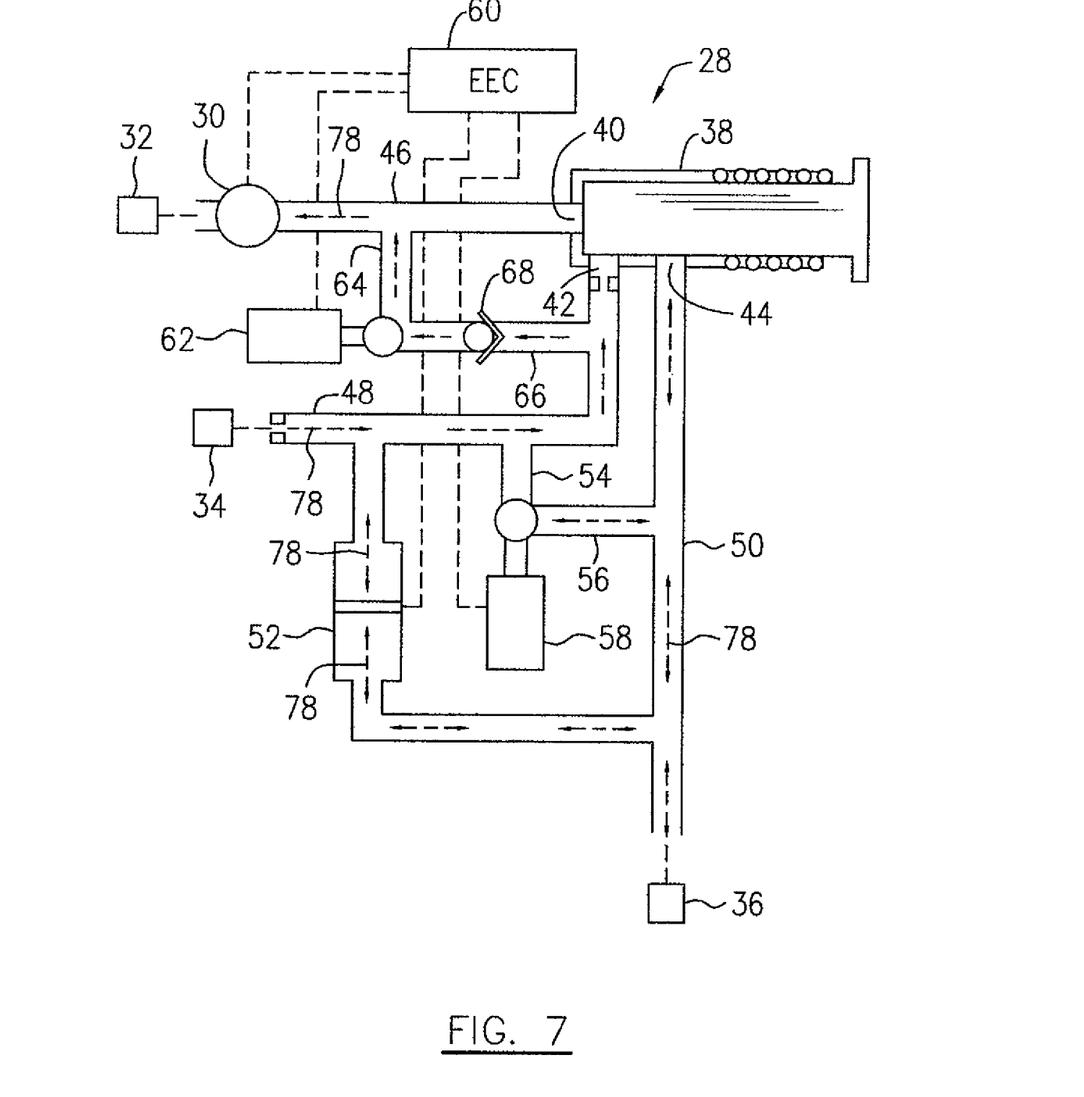
FIG. 7 is a schematic illustration of the fuel system of FIG. 2, showing a further step of the fuel system operation for reverse purging of fuel from the pilot torch nozzle.

Referring to FIG. 7, on a commanded shutdown sequence, the fuel pump 30 is shut off, causing fuel pressure at the inlet 40 of the minimum pressure/flow divider valve 38 to drop lower than the predetermined minimum pressure threshold or to zero. Thus, the minimum pressure/flow divider valve 38 under the spring force thereof is returned to a closed position, thereby closing inlet 40 and outlets 42, 44. Meanwhile, at a pre-determined compressor speed EEC 60 commands the ecology solenoid valve 62 to be activated to open the bypass formed by the fuel flow passages 64, 66 and the flow equalization solenoid valve 58 to be activated to close the fuel flow passages 54, 56.

At this moment, the residual compressed air from the compressor 22 of FIG. 1 has a relatively high residual pressure value and is in fluidic communication with the system 28 via the pilot torch nozzle 34 and the main manifold 36, thereby creating a reversed pressure differential in the fuel system 28, in contrast to the fuel pressure differential in the fuel system 28 established by the fuel pump 30 for supplying fuel to the respective pilot torch nozzle 34 and the main manifold 36, as previously described with reference to FIGS. 3-6. The fuel remaining in the pilot torch nozzle 34 is forced by such a reversed pressure differential, to flow back through the fuel flow passage 48, the bypass of fuel flow passages 66, 64, the fuel flow passages 46 and the fuel pump 30, and into the fuel source 32. At this time, the fuel remaining in the main manifold 36 under the same reversed pressure differential, cannot flow back to the fuel source 32 through the fluidic connection of the fuel system 28 because the fuel flow passages 54, 56 which are connected to the respective fuel flow passages 48 and 50, have been closed by the flow equalization solenoid valve 58, and fluidic communication between the fuel flow passages 48 and 50 via the minimum pressure/flow divider valve 38 has also been blocked by the closed position of this valve. Broken line arrows 78 illustrate the fuel flow in the fuel system 28 under the reversed pressure differential having a relative high value created by the residual compressor air. Single head arrows 78 indicate the flow direction and double head arrows 78 indicate that the fuel flow is blocked.

Figure 8:
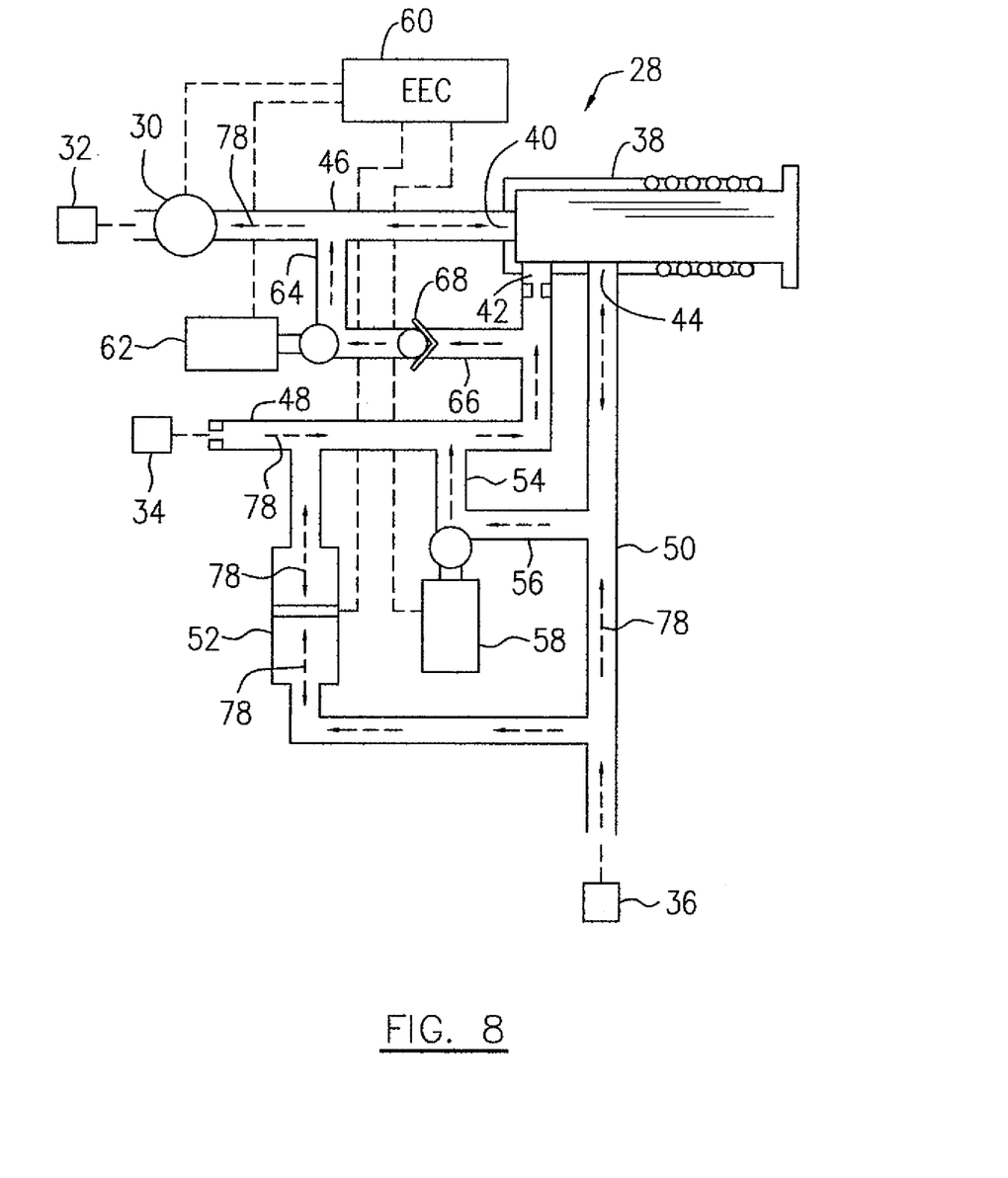
FIG. 8 is a schematic illustration of the fuel system of FIG. 2, showing a further step of the fuel system operation for reverse purging of fuel from the main manifold of the combustor.

Referring to FIG. 8, after a relatively short time delay from the moment of engine shutdown, the reversed pressure differential in the fuel system 28 changes to a relatively low value due to the residual compressor air pressure drop as the compressor speed reduces. Nevertheless, the reversed pressure differential in the fuel system 28 with the relatively low value is still sufficient to substantially purge the fuel from the fuel system 28. At this moment, EEC 60 commands the flow equalization solenoid valve 58 to open the fuel flow passages 54, 56 to fluidically connect the fuel flow passage 48 and 50. Thus, the fuel remaining in the main manifold 36 and fuel flow passage 50 can be forced by the reversed pressure differential in the fuel system 28, to flow through the fuel flow passages 56, 54, 48, 66, 64 and 46 and the fuel pump 30, into the fuel source 32. The ecology solenoid valve 62 remains activated and flow equalization solenoid valve 58 remains deactivated to open the fluidic connection of the fuel system 28 in order to allow fuel to be substantially purged from the pilot torch nozzle 34 and the manifold 36, before the residual compressor air pressure drops to zero. Broken line arrows 78 are used to indicate fuel flow under the reversed pressure differential having a relatively low value.

Such a time delay to begin purging the fuel from the main manifold is preferable because the fuel flow from the pilot torch nozzles 34 through the fluidic connection of the fuel system 28 confronts relatively high resistance in contrast to the flow resistance of the fuel flow from the main manifold 36 through the fluidic connection of the fuel system 28 to the fuel sources 32. Therefore, the reversed pressure differential having a high level is preferred in order to substantially purge the fuel from the pilot torch nozzles 34.

It should be noted that the fuel flow under the reversed pressure differential is forced to pass through the fuel pump 30 to the fuel source 32. Therefore, the fuel pump 30 is preferably of a type having a relatively high leakage volume when the fuel pump 30 is not in operation, such as a vane type. However, if a fuel pump having a low leakage volume in non-operative conditions is used, such a fuel pump may be driven in a reversed rotational direction at a low speed to facilitate the passing through of the fuel during the fuel purging process, but not for performing a vacuum pump function.

When the fuel purging process is completed (which may be determined by differential pressure transducer 52 signals or simply by a time lapse), EEC 60 commands both the ecology solenoid valve 62 and the flow equalization solenoid valve 58 to be deactivated such that the ecology solenoid valve 52 is closed and the equalization solenoid valve 58 is open, as illustrated in FIG. 2.

It should be noted that a relatively low range (i.e. sensitive) pressure transducer is preferred for the purpose of monitoring flow during start and fuel pulses on manifold filling. It is preferable to use a sensitive or low range pressure transducer in practical terms in the embodiment of the present invention because the transducer never has a high pressure differential applied to it. The differential pressure is shunted out via fuel passages 54 and 56 in conjunction with flow equalization valve 58, limiting the maximum differential pressure to which the transducer is exposed. For example, the differential pressure during start is of the order of 100 PSI maximum, however the fuel system pressure may be over 1000 PSI during take off conditions. A transducer used for applications involving 1000 PSI is very poor at resolving small pressure differentials needed to control flow at low flow conditions. Therefore, it is preferable to have a transducer having a maximum pressure indication for example, not greater than 120 PSI.

Figure 9:
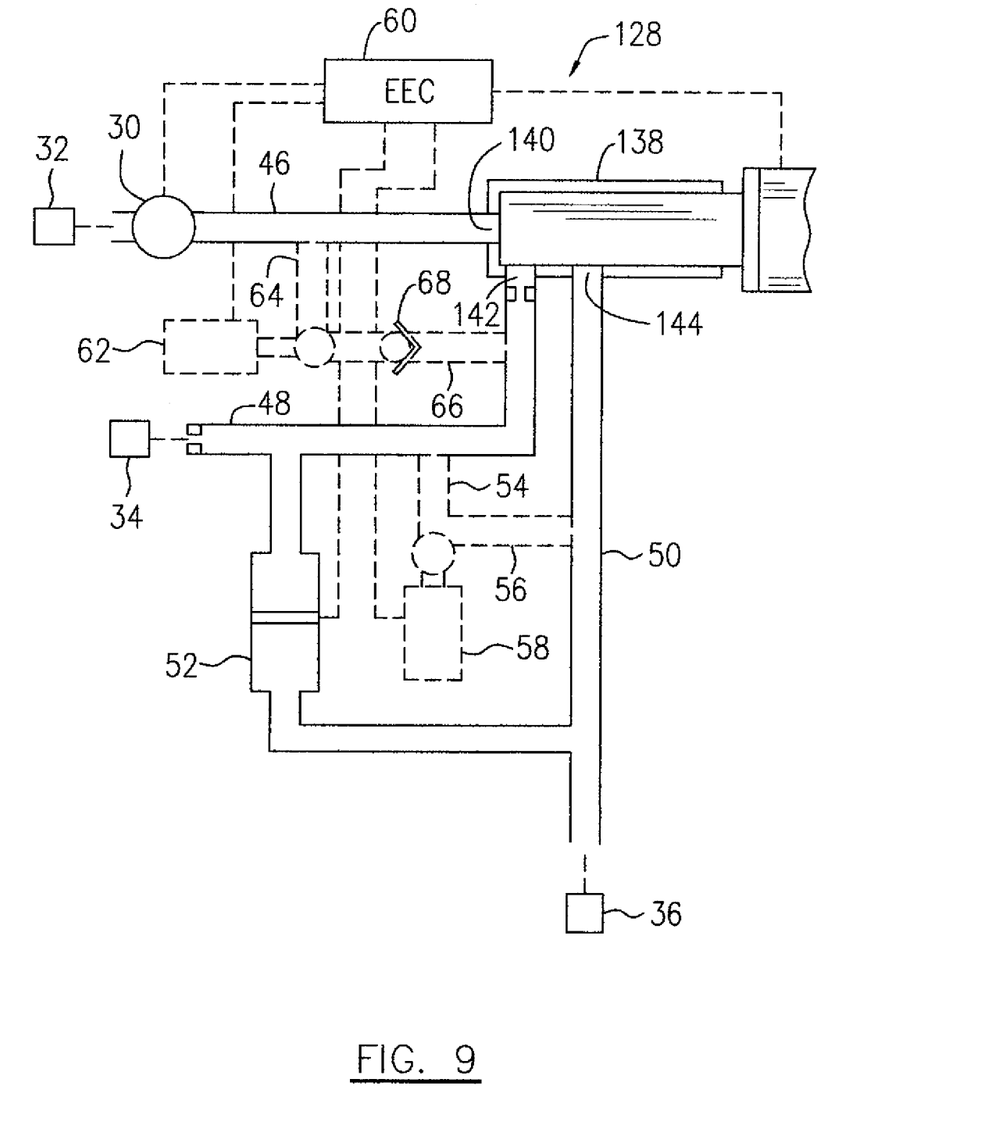
FIG. 9 is a schematic illustration of the fuel system, showing the embodiments thereof, alternative to the embodiment of FIG. 2.

In FIG. 9, a schematic illustration is used to show in principle an alternative embodiment of the present invention which may not be a complete system and may need more components to be included in a practical view point. Fuel system 128 is a simplified version of the fuel system 28 of FIG. 2. Similar components are indicated by similar numeral references and will not be redundantly described herein. The fuel system 128 is implemented by omission of the bypass including the fuel flow passage 64, 66 with the ecology solenoid valve 62 and the check valve 68, or by omission of both that bypass and the fluidic connection between the fuel flow passages 48 and 50, including the fuel flow passages 54, 56 and the flow equalization solenoid valve 58, as shown in broken lines in FIG. 9. Furthermore, as a result of such omissions, the minimum pressure/flow divider valve 38 of the fuel system 28 of FIG. 2 is replaced by, for example, an EEC-controlled flow divider solenoid valve 138, having inlet 140 and outlets 142 and 144. The valve 138 is operated on the commands of EEC 60 rather than by the pressure changes at inlet 140.

During engine start-up and operating conditions, fuel is driven by the fuel pump 30 to the respective pilot torch nozzles 34 and the main manifold 36 in patterns similar to those illustrated in FIGS. 3-6, if only the bypass with the ecology solenoid valve 62 and the check valve 68 are omitted. (The fluidic connection between the fuel flow passages 48 and 50 including the fuel flow passages 54, 56 with the flow equalization solenoid valve 58 remain in the system.)

Should both the bypass with the ecology solenoid valve 62 and the check valve 68 and the fluidic connection including fuel flow passages 54, 56 with the flow equalization solenoid valve 58 be omitted, the fuel driven by the fuel pump 30 to the main manifold in both the processes of refilling the manifold at a low fuel pressure and supplying fuel to the combustor at a high fuel pressure for combustion, are directed through the open inlet 140 and outlet 144 and the fuel flow passage 50, similar to the step illustrated in FIG. 6 (but without the additional fuel flow through the fuel flow passages 54, 56 which have been omitted).

In a commanded engine shutdown sequence, the fuel pump stops and the revised pressure differential is created by the residual compressor air. In order to allow the fuel remaining in the pilot torch nozzles 34 and the main manifold 36 to flow back through the system to the fuel source 32, the valve 138 remains in an open status. The time delay between the start points of purging fuel from the pilot torch nozzles 34 and purging the fuel from the main manifold 36 can be achieved by controlling the flow equalization solenoid valve 58 (if it is included in the fuel system 128) similar to the description with reference to FIGS. 7 and 8, or by controlling the time difference between opening outlets 142 and 144 of the valve 138 during the fuel purging process (if the fluidic connection of fuel flow passage 54, 56 with the flow equalization solenoid valve 58 are omitted).

The above description is meant to be exemplary only, and one skilled in the art will recognize that changes may be made to the embodiments described without departure from the scope of the invention disclosed. For example, the present invention can be applied to various types of gas turbine engines other than a turbofan gas engine which is used as an example to illustrate the application of the present invention. A fuel system may include more or less components therein for various types of gas turbine engines without departing from the spirit of the claimed invention, and may include but not be limited to fuel reheating devices, fuel metering devices, etc. The bypass controlled by the ecology solenoid valve of the present invention can be added to fuel systems of various types which may not include fuel flow passages to a pilot torch nozzle and do not allow purging of fuel from a main manifold of the combustor of the fuel system, in order to achieve purging of fuel from the main manifold of the combustor through the system via the added bypass. Still other modifications which fall within the scope of the present invention will be apparent to those skilled in the art, in light of a review of this disclosure, and such modifications are intended to fall within the appended claims.

The invention claimed is:

1. A method for operating a fuel system of a gas turbine engine, the method comprising:
   pumping a fuel flow from a fuel source through a first section of the system to a pilot nozzle for pilot ignition;
   pumping a fuel flow from the fuel source through a second section of the system to a manifold of a combustor of the engine for combustion; and
   using only a single differential pressure transducer included in the system to monitor a pressure differential between the first and second sections, thereby producing a reference signal accordingly for operating the fuel system.

2. The method as defined in claim 1 comprising establishing a low fuel pressure for directing the fuel flow to the pilot nozzle and establishing a high fuel pressure for directing the fuel to both the pilot nozzle and the manifold.

3. The method as defined in claim 1 comprising temporarily directing the fuel flow to the manifold and terminating the fuel flew to the manifold upon fill-up of the manifold before engine ignition is established.

4. The method as defined in claim 1 further comprising:
   terminating operation of the fuel pump on shutdown of the engine; and
   using residual compressed air from a compressor stage of the engine to create a reversed pressure differential in contrast to a forward pressure in the system when the fuel pump is in operation, and under the reversed pressure differential substantially purging fuel remaining in the manifold and pilot nozzle through the system to the fuel source.

5. The method as defined in claim 4 further comprising purging fuel remaining in the pilot nozzle through the first section of the system when the reversed pressure differential remains at a high value and purging fuel remaining in the manifold through the second section of the system when the reversed pressure differential changes to a low value.

6. The method as defined in claim 5 wherein the purging of fuel through the first and second sections of the system under the reversed pressure differential having the respective high and low values is achieved by purging fuel through the second section after a time delay with respect to a start point of purging fuel through the first section.

* * * * *